United States Patent
Lim et al.

(10) Patent No.: US 8,706,040 B2
(45) Date of Patent: Apr. 22, 2014

(54) METHOD FOR AVOIDING INTER-CELL INTERFERENCE IN MULTI-CELL ENVIRONMENT USING MULTIPLE CODEBOOKS

(75) Inventors: Dong Guk Lim, Inchen-si (KR); Wook Bong Lee, Sungnam-si (KR); Su Nam Kim, Seoul (KR); Bin Chul Ihm, Anyang-si (KR); Jae Wan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 565 days.

(21) Appl. No.: 13/002,569

(22) PCT Filed: Jul. 6, 2009

(86) PCT No.: PCT/KR2009/003669
§ 371 (c)(1),
(2), (4) Date: Jan. 10, 2011

(87) PCT Pub. No.: WO2010/002230
PCT Pub. Date: Jan. 7, 2010

(65) Prior Publication Data
US 2011/0105164 A1 May 5, 2011

Related U.S. Application Data

(60) Provisional application No. 61/078,339, filed on Jul. 4, 2008.

(30) Foreign Application Priority Data

Sep. 22, 2008 (KR) .................. 10-2008-0092807

(51) Int. Cl.
*H04B 1/00* (2006.01)

(52) U.S. Cl.
USPC .......... 455/63.1; 375/262; 375/267; 342/368; 455/439; 455/501

(58) Field of Classification Search
USPC ....................................... 455/63.1
See application file for complete search history.

(56) References Cited

U.S. PATENT DOCUMENTS

| | | | |
|---|---|---|---|
| 2005/0096901 A1* | 5/2005 | Uvliden et al. | 704/219 |
| 2006/0172738 A1* | 8/2006 | Kwon et al. | 455/439 |
| 2008/0165876 A1* | 7/2008 | Suh et al. | 375/262 |
| 2008/0232501 A1* | 9/2008 | Khojastepour et al. | 375/267 |
| 2009/0179797 A1* | 7/2009 | Kwon et al. | 342/368 |
| 2009/0274225 A1* | 11/2009 | Khojastepour et al. | 375/260 |
| 2010/0035627 A1* | 2/2010 | Hou et al. | 455/452.2 |
| 2010/0067461 A1* | 3/2010 | Kwak et al. | 370/329 |
| 2010/0118800 A1* | 5/2010 | Kim et al. | 370/329 |

\* cited by examiner

*Primary Examiner* — David Bilodeau
(74) *Attorney, Agent, or Firm* — Morgan, Lewis & Bockius LLP (57) ABSTRACT

A method is disclosed for avoiding inter-cell interference in a closed-loop multiple-input multiple-output (MIMO) system using a plurality of codebooks. A base station of a serving cell transmits information about codebooks used in an interfering cell among the plurality of codebooks to a mobile station. The transmission of the information may be made at the request of the mobile station. Alternatively, the mobile station may directly measure information about codebooks used in the interfering cell among the plurality of codebooks. The mobile station measures restricted precoding matrix indexes (PMIs) or requested PMIs based on the codebook information. The measured PMIs are transmitted to the interfering cell and are used to restrict the use of a PMI in the interfering cell.

7 Claims, 4 Drawing Sheets

METHOD FOR AVOIDING INTER-CELL INTERFERENCE IN MULTI-CELL ENVIRONMENT USING MULTIPLE CODEBOOKS

The present application is a national stage of PCT International Application No. PCT/KR2009/003669, filed Jul. 6, 2009, and claims the benefit of U.S. Provisional Application No. 61/078,339, filed Jul. 4, 2008. The present national stage application also claims the benefit of Korean Patent Application No. 10-2008-0092807, filed Sep. 22, 2008.

TECHNICAL FIELD

The present invention relates to mobile communication, and more particularly, to a method for avoiding inter-cell interference in a multi-cell environment.

BACKGROUND ART

In next generation mobile communication and wireless transmission systems, an improved data transmission rate and system capacity needed in a multi-cell environment have been demanded. To meet such a demand, studies on a multiple-input multiple-output (MIMO) system, which transmits data using multiple antennas, have been conducted. To improve the data transmission rate in a multi-cell environment, a closed-loop MIMO system using channel information improves transmission capabilities using the channel information. To use a proper codebook according to an environment of each cell in a multi-cell environment, a plurality of codebooks is used to provide improved service to a mobile station (MS).

Generally, in a MIMO system, an MS can recognize information about a reception channel using received data, whereas a base station (BS) cannot know the channel information. To improve the performance of a system using the channel information, the BS should be aware of the channel information. When a time division duplex (TDD) scheme is used, since an uplink channel and a downlink channel between the BS and the MS are the same, the BS can know the channel information. To provide a high-quality service to MSs within a cell in a closed-loop MIMO system in a multi-cell environment, BSs allocate an optimal pre-codebook to MSs based on a channel state between the BSs and MSs.

The closed-loop MIMO system transmits data using information about a transmission channel of an MS serviced by a BS. In this case, since the BS cannot be aware of information about the transmission channel of the MS, the BS obtain the channel information, for example, channel state information (CSI), a channel quality indicator (CQI), and a precoding matrix index (PMI) from the MS.

In a multi-cell environment, the MS estimates a channel through which data is transmitted using a signal received from the BS. Next, the MS calculates the CQI using the estimated channel. The CQI is used to apply a modulation coding scheme (MCS) suitable for a channel state when the BS transmits data. Moreover, a channel coefficient which is most suitable for a channel state, that is, a precoding vector may be selected from a codebook used in an each cell using the estimated channel and a plurality of codebooks. Channel information obtained by the MS using the estimated channel is transmitted through a feedback channel between the BS and the MS. The BS selects the MCS and the precoding vector of the codebook using the channel information received from the MS. Thereafter, the BS transmits data to the MS using the selected MCS and the selected precoding vector of the codebook.

However, an MS in an edge of a cell receives a signal having weak strength from a BS of the cell to which the MS belongs and is subject to interference by an optimal pre-codebook allocated to an MS belonging to a neighboring cell by a BS of the neighboring cell. The MS in an edge of a cell decreases in performance by inter-cell interference caused by a pre-codebook.

Numerous studies on a closed-loop MIMO system have been conducted. A closed-loop MIMO scheme has been applied to a multi-cell environment as well as a single-cell environment. However, studies on a method for eliminating inter-cell interference by restricting a codebook used in each cell in order to reduce an influence caused by interference from other cells in the multi-cell environment is not active.

In a system using a closed-loop MIMO scheme in a multi-cell environment, BSs of each cell allocate an optimal codebook vector to MSs in consideration of a reception status of the MS within each cell. An MS in an edge of a cell is subject to interference by the optimal codebook vector allocated from a neighboring cell. The performance of the MS in an edge of a cell is decreased by the interference of the codebook vector.

Inter-cell interference mitigation proposed to eliminate interference caused by the codebook vector is applied to the case where the same codebook is used in each cell. Therefore, when a plurality of codebooks is used, inter-cell interference is not efficiently eliminated by the inter-cell interference mitigation.

DISCLOSURE

Technical Problem

An object of the present invention devised to solve the problem lies in providing a method and/or an apparatus for preventing the performance of an MS in an edge of a cell from decreasing due to inter-cell interference caused by a pre-codebook in a system using a plurality of codebooks.

Technical Solution

Hereinafter, terms used to describe the present invention will be explained in brief. With respect to a specific MS, a cell to which the MS belongs may be referred to as a 'serving cell' and a cell adjacent to the serving cell may be referred to a 'neighboring cell'. Among neighboring cells, a cell creating interference with respect to a specific MS may be referred to as an 'interfering cell'. Namely, it should be appreciated that the 'serving cell', 'neighboring cell', and 'interfering cell' are concepts determined relative to a specific MS. BSs belonging to the serving cell, neighboring cell, and interfering cell may be referred to as a 'serving BS', a 'neighboring BS', and an 'interfering BS', respectively.

The object of the present invention can be achieved by providing a method for avoiding inter-cell interference in a closed-loop MIMO system using a plurality of codebooks, including transmitting, to a mobile station, information about one or more codebooks used in one or more neighboring cells among the plurality of codebooks. The information about the codebooks is used by the mobile station to measure restricted PMIs which should be restricted to use in the neighboring cells or requested PMIs which should be used in the neighboring cells, the measured restricted PMIs or requested PMIs are transmitted to the neighboring cells together with at least one of information elements of a channel quality indicator (CQI), a carrier to interference-plus-noise ratio (CINR), a signal to interference-plus-noise ratio (SINR), an interference level, an interference vector, or an interference power of each of the measured restricted PMIs or requested PMIs, the information elements are used in the neighboring cells to arrange the restricted PMIs or requested PMIs according to an interference degree, and a PMI which is to be applied to an neighboring cell is selected from among the restricted or requested PMIs based on an arranged result. Before the transmission of the information, the method may further include receiving, from the mobile station, a request for information about a codebook used in a neighboring cell generating interference with respect to the mobile station. The request may be made when the information about the codebook cannot be measured by the mobile station based on a signal received from the one or more neighboring cells. The transmission of the information may be performed using a handover message. The request may be made when a codebook used by the mobile station is different from a codebook used in the neighboring cell. The transmission of the information may be performed through one or more of a broadcast channel, a multicast channel, and a unicast channel, and the one or more neighboring cells may be all cells adjacent to a serving cell to which the mobile station belongs. The information about the one or more codebooks may include information indicating that each of the one or more codebooks is for a single user or for multiple users.

In another aspect of the present invention, provided herein is a method for avoiding inter-cell interference in a closed-loop MIMO system using a plurality of codebooks, including receiving information about one or more codebooks used in one or more neighboring cells among the plurality of codebooks, measuring at least one of restricted codebook vectors (restricted PMIs) which should be restricted to use in the one or more neighboring cells and requested codebook vectors (requested PMIs) which should be used in the one or more neighboring cells, based on the received information about the one or more codebooks, and transmitting at least one of the measured restricted codebook vectors and requested codebook vectors to a serving base station of a serving cell. The method may further include transmitting information about a transmitted codebook to a serving base station of a serving cell to which a mobile station belongs according to a codebook change period in each cell using the transmitted codebook. The method may further include measuring at least one of a CQI, a CINR, an SINR, an interference level, an interference vector, and an interference power of each of the measured restricted codebook vectors or requested codebook vectors, and transmitting at least one of the measured CQI, CINR, SINR, interference level, interference vector, and interference power to a serving base station of a serving cell. At least one of the information about the one or more codebooks, the measured restricted codebook vectors, and the measured requested codebook vectors may be transmitted to an upper layer.

In a further aspect of the present invention, provided herein is a method for avoiding inter-cell interference in a closed-loop MIMO system using a plurality of codebooks, including measuring information about one or more codebooks used in one or more neighboring cells which generate interference with respect to a mobile station belonging to a serving cell and are adjacent to the serving cell, based on signals received from the one or more neighboring cells. The method may further include measuring, by the mobile station, at least one of restricted codebook vectors which should be restricted to use in the one or more neighboring cells and requested codebook vectors which should be used in the one or more neighboring cells, based on the measured information about the one or more codebooks. The method may further include transmitting, by the mobile station, at least one of the measured restricted codebook vectors and the measured requested codebook vectors to a serving base station of a serving cell to which the mobile station belongs. The method may further include transmitting the measured information about the codebooks to a serving base station of a serving cell to which the mobile station belongs together with or separately from at least one of the measured restricted codebook vectors and the measured requested codebook vectors according to a codebook change period in each cell using the measured codebooks. At least one of the information about the one or more codebooks, the measured restricted codebook vectors, and the measured requested codebook vectors may be transmitted to an upper layer.

In another aspect of the present invention, provided herein is a method for avoiding inter-cell interference in a closed-loop MIMO system using a plurality of codebooks, including receiving first information about one or more restricted PMIs or requested PMIs measured by one or more mobile stations in a neighboring cell, receiving second information about a CQI, a CINR, an SINR, an interference level, an interference vector, and an interference power of each of the restricted PMIs and requested PMIs, arranging the restricted PMIs and requested PMIs according to an interference degree using the second information, and selecting a PMI based on an arranged result.

Advantageous Effects

According to the present invention, inter-cell interference caused by a pre-codebook in a system using a plurality of codebooks can be prevented or eliminated. Specifically, codebook information of an interference cell is used and a BS of the interference cell restricts the use of a precoding vector which affects other cells and uses a sub-optimal codebook vector, thereby improving the performance of an overall cell as well as an edge MS of a cell. PMI and codebook information for restricting the use of the codebook vector in the interference cell are transmitted to an upper layer. Therefore, overhead can be reduced by employing the PMI and codebook information for a long period of time.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Reference will now be made in detail to the exemplary embodiments of the present invention, examples of which are illustrated in the accompanying drawings. Wherever possible, the same reference numbers will be used throughout this specification to refer to the same or like parts.

A reception signal of a closed-loop MIMO system which provides a service to an MS using precoding may be indicated by the following Equation 1.

$$Y = Hw_i X + n \quad \text{[Equation 1]}$$

where H denotes a channel, n denotes zero mean Gaussian noise, and $w_i$ denotes an optimal codebook vector determined by a BS before the BS transmits data. The codebook vector of a codebook W is varied according to the number of transmit and receive antennas and the number of transmitted streams. The codebook W is comprised of codebook vectors as indicated by Equation 2.

$$W = [w_1 w_2 w_1 \ldots w_N] w_i : i = 1, 2, \ldots, N \quad \text{[Equation 2]}$$

where $w_i$ denotes an i-th precoding vector of the codebook.

A BS of each cell using a plurality of codebooks selects a codebook suitable for each cell environment. The BS of each cell uses the selected codebook when transmitting data to an MS. The MS selects a codebook vector having optimal performance within the codebook selected by the BS using a received signal. The MS transmits the selected codebook vector to the BS through a feedback channel. Power control and rate control for a transmission stream can be performed using such precoding and co-channel interference can be eliminated.

Figure 1:
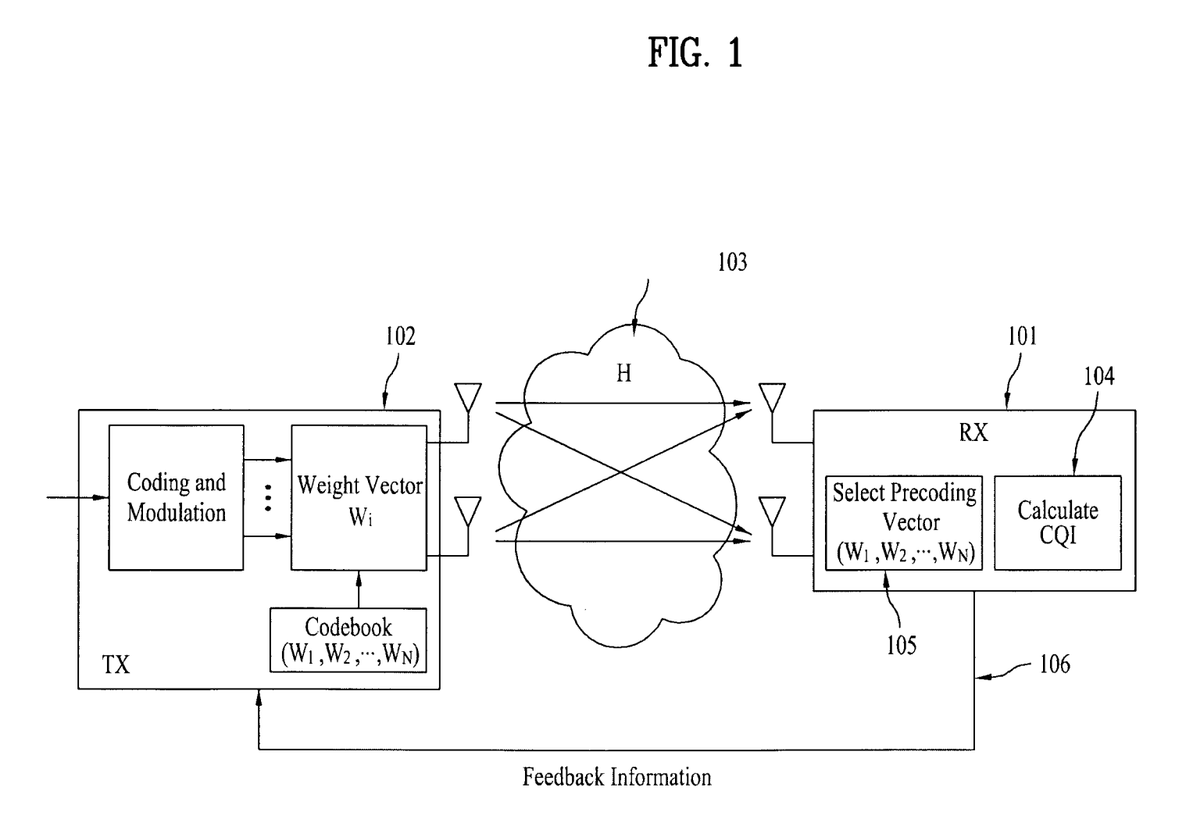
FIG. 1 is a view illustrating the configuration of a system using a closed-loop MIMO scheme.

FIG. 1 is a view illustrating the configuration of a system using a closed-loop MIMO scheme. Since BSs $BS_1, \ldots, BS_N$ cannot know information about transmission channels of MSs $MS_1, \ldots, MS_K$ which are being serviced, the BSs obtain channel information, for example, CSI, a CQI, a PMI, etc., from the MSs. Next, the BSs transmit data using the information about the transmission channels of the MSs.

An MS 101 estimates a channel 103, through which data is received, using a signal received from a BS 102. To apply a modulation and coding scheme (MCS) suitable for a channel state when the BS 102 transmits data, the MS 101 calculates a CQI using the estimated channel (step 104). Moreover, using the estimated channel and a codebook, the MS 101 selects a channel coefficient which is most appropriate to a channel state, that is, a precoding vector from an already known codebook (step 105). Channel information obtained using the estimated channel by the MS 101 is transmitted through a feedback channel 106 between the BS 102 and the MS 101 to the BS 102. The BS 102 transmits data to the MS 101 using the channel information received from the MS 101, the selected MCS, and the precoding vector of the codebook.

The performance of an MS of a closed-loop MIMO scheme using a plurality of codebooks in a multi-cell environment is degraded by inter-cell interference due to a neighboring cell. In this case, an MS in an edge of a cell is subject to interference from a neighboring cell because a signal received from a BS of a serving cell to which the edge MS belongs is weak.

Figure 2:
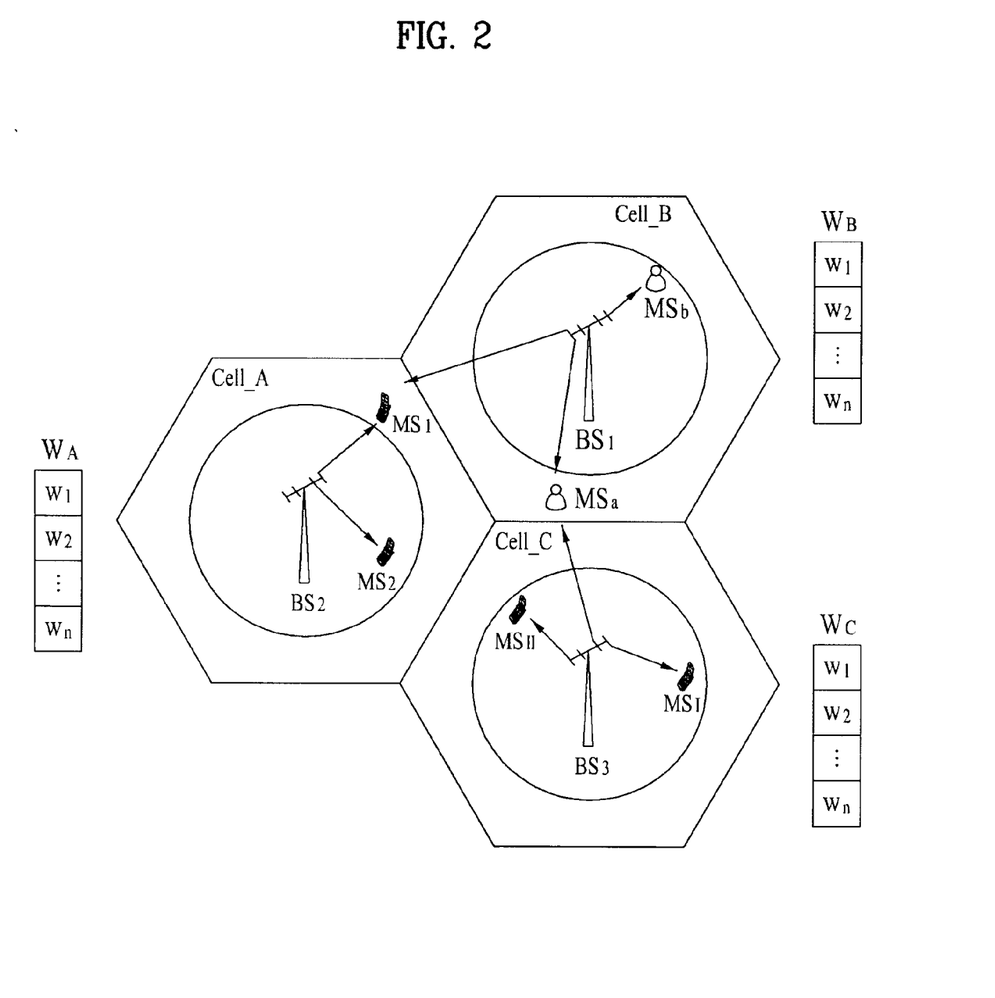
FIG. 2 is a view illustrating a method of using a plurality of codebooks utilizing a method for restricting the use of a codebook vector according to an exemplary embodiment of the present invention.

FIG. 2 is a view illustrating a method of using a plurality of codebooks utilizing a method for restricting the use of a codebook vector according to an exemplary embodiment of the present invention.

Referring to FIG. 2, occurrence of interference due to neighboring cells in a multi-cell environment is shown. Each cell is indicated as a hexagonal area. In each cell, an outer area of a boundary indicated by a circle denotes an edge area of the cell. A part except for the edge area of the cell may be called a central area of the cell. An MS in the edge area of the cell may be called an edge MS. It should be noted that the structure and terms used in conjunction with FIG. 2 are purely for the sake of convenience.

In FIG. 2, edge MSs $MS_1$ and $MS_a$ in edges of cells Cell_A and Cell_B receive a very weak signal from the serving cells Cell_A and Cell_B to which the edge MSs $MS_1$ and $MS_a$ belong. In addition, the edge MSs $MS_1$ and $MS_a$ are subject to substantial interference from neighboring cells and thus reception performance thereof is degraded. Meanwhile, MSs $MS_2$, $MS_b$, $MS_I$, and $MS_{II}$ in central areas of cells Cell_A, Cell_B, and Cell_C have very good reception signals because they are near to BSs $BS_1$, $BS_2$, and $BS_3$ of the cells to which they belong. Moreover, each of the MSs $MS_2$, $MS_b$, $MS_I$, and $MS_{II}$ in the central areas of the cells is less affected by interference caused by other cells and thus has little effect on reception performance thereof. Accordingly, the MSs $MS_1$ and $MS_a$ in the edges of the cells are more heavily influenced by neighboring cells than the MSs $MS_2$, $MS_b$, $MS_I$, and $MS_{II}$ in the central areas of the cells and performance thereof is deteriorated.

The BSs $BS_1$, $BS_2$, and $BS_3$ of the cells using closed-loop MIMO in such a multi-cell environment employ different types of codebooks and transmit data using optimal codebook vectors considering a channel state for each MS. If a plurality of codebook vectors used for each MS is correlated or beam patterns due to the codebook vectors are overlapped, the codebook vectors are influenced by each other. Accordingly, when MSs within a serving cell receive data from a serving BS using optimal codebook vectors suitable for a channel state, an edge MS of the serving cell is affected by the optimal codebook vectors used by a BS of a neighboring cell for MSs in the neighboring cell and is subject to strong inter-cell interference. In order to reduce an influence caused by inter-cell interference in a multi-cell environment and to reduce an influence between codebook vectors used by MSs employing closed MIMO, the use of codebook vectors of an interfering cell may be restricted.

Two methods may be broadly used to restrict the use of codebook vectors.

In the first method, an MS measures a restricted codebook vector which should not be used in an interfering cell and transmits the measured codebook vector to the interfering cell. The restricted codebook vector may be a codebook vector of an interfering cell creating the greatest interference with respect to an MS. The interfering cell may then restrict the use of the restricted codebook vector.

In the second method, an MS measures a requested codebook vector which is requested to be used in an interfering cell and transmits the measured codebook vector to the interfering cell. The request codebook vector may be a codebook vector having the least effect on an MS. The interfering cell may then use the requested codebook vector. If an MS transmits the restricted codebook vector as well as the requested codebook vector, the interfering cell may use the requested codebook vector or a sub-optimal codebook vector except for the restricted codebook vector.

Referring to FIG. 2, the BSs of the respective cells may transmit data using different codebooks $W_A$, $W_B$, and $W_C$. Accordingly, in order to reduce interference caused by optimal precoding vectors used in the cells, an interfering cell may restrict the use of the precoding vector. To this end, an MS affected by interference should be aware of information about a codebook used in an interfering cell and a PMI which should not be used (or a PMI which should be used) in the interfering cell and transmit the information and PMI to a BS of a cell to which the MS belongs. A signal received by an edge MS of a cell is as follows.

$$r_k(t) = H_k w_k s_k(t) + \sum_{\substack{i=j \\ i \neq k}}^{N} H_j w_j s_j(t) \quad \text{[Equation 3]}$$

The first term on the right side of Equation 3 denotes a signal transmitted to an MS in a serving cell from the serving cell, and the second term thereof denotes interference due to a neighboring cell, and $H_i$ denotes channel information of each cell. Since respective cells use a plurality of codebooks, the codebooks used in the cells are different. To measure precoding vectors $w_1, w_2, \ldots, w_N$ included in a codebook used in an interfering cell, codebook information of each cell is necessary. If the different codebooks $W_A$, $W_B$, and $W_C$ are used in the cells Cell_A, Cell_B, and Cell_C as illustrated in FIG. 2, codebook information used by the BSs of the respective cells is necessary in order to restrict the use of a specific codebook vector with respect to each interfering cell.

Codebook information of a neighboring cell (or interfering cell) may be measured using a signal (e.g., a preamble or mid-amble) received by an MS.

Alternatively, a BS of each cell may transmit the codebook information of the neighboring cell (or interfering cell) to an MS. In this case, the codebook information of the interfering cell may be transmitted using a handover message. For example, when an edge MS of a cell receives handover information, the handover information received by the edge MS of a cell includes information about a neighboring cell, Cell_ID, or information about a BS of the neighboring cell, BS_ID, and a received signal strength indicator (RSSI) from the neighboring cell. An edge MS of a cell determines an interfering cell as a cell which transmits the strongest signal, that is, a cell having the greatest RSSI, using the RSSI from a neighboring cell. To determine one or more interfering cells, the interfering cells are determined in order of the magnitude of the RSSI. To obtain codebook information of the determined interfering cells, an MS transmits information (Cell_ID or BS_ID) about the determined interfering cells to a BS of a cell to which the MS belongs and receives the codebook information of the determined interfering cells from the BS using a handover message.

An MS may request a BS to transmit codebook information of an interfering cell, by transmitting information indicating that a codebook different from a codebook used in the MS is used in the interfering cell or transmitting a codebook indicator used by the interfering cell to a BS of a cell to which the MS belongs. For example, the MS estimates an interfering cell using a received signal and transmits an ID of the interfering cell to a BS, thereby requesting codebook information. Alternatively, the MS measures an index of a codebook used by an interfering cell and transmits the measured index of the codebook to a BS, thereby requesting codebook information. Further, the MS may compare a measured codebook indicator of an interfering cell with a codebook indicator thereof. If the codebook indicators are different, the MS transmits the codebook indicator of the interfering cell to a BS to which the MS belongs, thereby requesting codebook information. The codebook indicator may be a codebook index for example.

Even though cells use a single-user (SU) MIMO codebook and a multi-user (MU) MIMO codebook according to a channel state and an MS environment, an MS should transmit information about codebooks used in the respective cells. For example, if a cell A uses an SU MIMO codebook and a cell B uses an MU MIMO codebook, an MS transmits information of codebooks used in the respective cells, including information about a single-user or a multi-user.

Since a BS of each cell transmits data to an MS using a plurality of codebooks, the codebooks used in each cell may be changed semi-statically or dynamically according to a cell environment. If a codebook of each cell is changed, information about the codebook used by each cell may be transmitted to an MS from a BS semi-statically or dynamically at a prescribed period to restrict the use of a codebook vector for an interfering cell. Alternatively, each MS may measure information about the codebook used in each cell for a prescribed time period using a received signal. The measured or received information about the codebook used in an interfering cell is used to restrict the use of the codebook of the interfering cell. Namely, an edge MS measures a codebook vector which is restricted to use in the interfering cell using the measured or received codebook information of the interfering cell and transmits the codebook information of the interfering cell and a measured PMI to a BS of a cell to which the MS belongs.

The codebook information of the interfering cell may be transmitted together with or separately from a restricted PMI according to a codebook change period in each cell using a plurality of codebooks, that is, according to whether the codebook is changed statically, semi-statically, or dynamically. Feedback information transmitted to a serving BS by an MS in order to restrict a codebook vector used in an interfering cell includes, a cell_ID, a BS_ID, a restricted PMI, a band indicator, a codebook indicator or codebook index, an SU/MU, rank information, interference power level for a restricted PMI, and/or CQI (Channel Quality Indicator).

Such feedback information is directly or indirectly transmitted to an interfering cell through a feedback channel between an MS and a serving BS of a cell to which the MS belongs, or through a feedback channel between an MS and an interfering BS of an interfering cell. The feedback information is transmitted to each interfering cell from a serving cell to which the MS belongs through a backbone, backhaul, an air interface, etc., between BSs.

The use of a codebook vector for a whole band or a specific band used in an interfering cell is restricted by a PMI of the interfering cell fed back to a BS. When transmitted PMI information is applied throughout a whole band of the interfering cell, a band indicator is not transmitted to a BS.

When using rank adaptation in each interfering cell, an MS of another cell influenced by the interfering cell may measure a PMI corresponding to each rank and place restrictions on each rank using the measured PMI to reduce interference caused by a codebook vector. Alternatively, restrictions may be imposed on only a codebook of rank 1 having the strongest signal to reduce interference caused by a codebook vector. If a codebook of an upper rank includes a codebook of a lower rank, for example, a codebook of rank 1, restrictions may be placed on an upper rank including a PMI restricted when using rank 1 or on a codebook of the upper rank.

To restrict the use of a codebook with respect to a band of each interference cell or to restrict the use of a codebook with respect to a rank, an interfering cell receiving restricted PMI information from an MS through a backbone network or a feedback channel may restrict a PMI used by an MS in the interfering cell using the received information.

The interfering cell may restrict the use of a PMI using the received restricted PMI by the following two methods.

First, a BS receiving restricted PMI information does not allocate the restricted PMI to an MS. Namely, when a reception state of an MS within an interfering cell satisfies a threshold value for restricting the use of the PMI, if a feedback PMI is the same as the restricted PMI, the BS transmits to the MS a signal causing the MS to feed back another PMI. The MS receiving the signal transmits a sub-optimal PMI except for the same PMI as the restricted PMI to the BS.

Second, the interfering cell receiving the restricted PMI information transmits the restricted PMI information and a threshold value for restricting the use of a PMI to MSs within the interfering cell, so that the MSs within the interfering cell satisfying the threshold value may use another PMI except for the received restricted PMI. All MSs within the interfering cell may be restricted in using the PMI by a BS of the interfering cell based on the restricted PMI information. All the MSs located in the interfering cell is restricted according to the threshold value transmitted by the BS or is variably restricted according to a reception state of an MS. The threshold value for restricting the use of the PMI is determined by the BS using information (a signal to interference-plus-noise ratio (SINR), a CQI, a signal to interference ratio (SIR), an interference power, an RSSI, etc.) transmitted by the MS.

A threshold value used to set an MS which is to transmit information about an interfering cell is determined by a BS using the above information and is transmitted to the MS, or is determined at the request of the MS.

Figure 3:
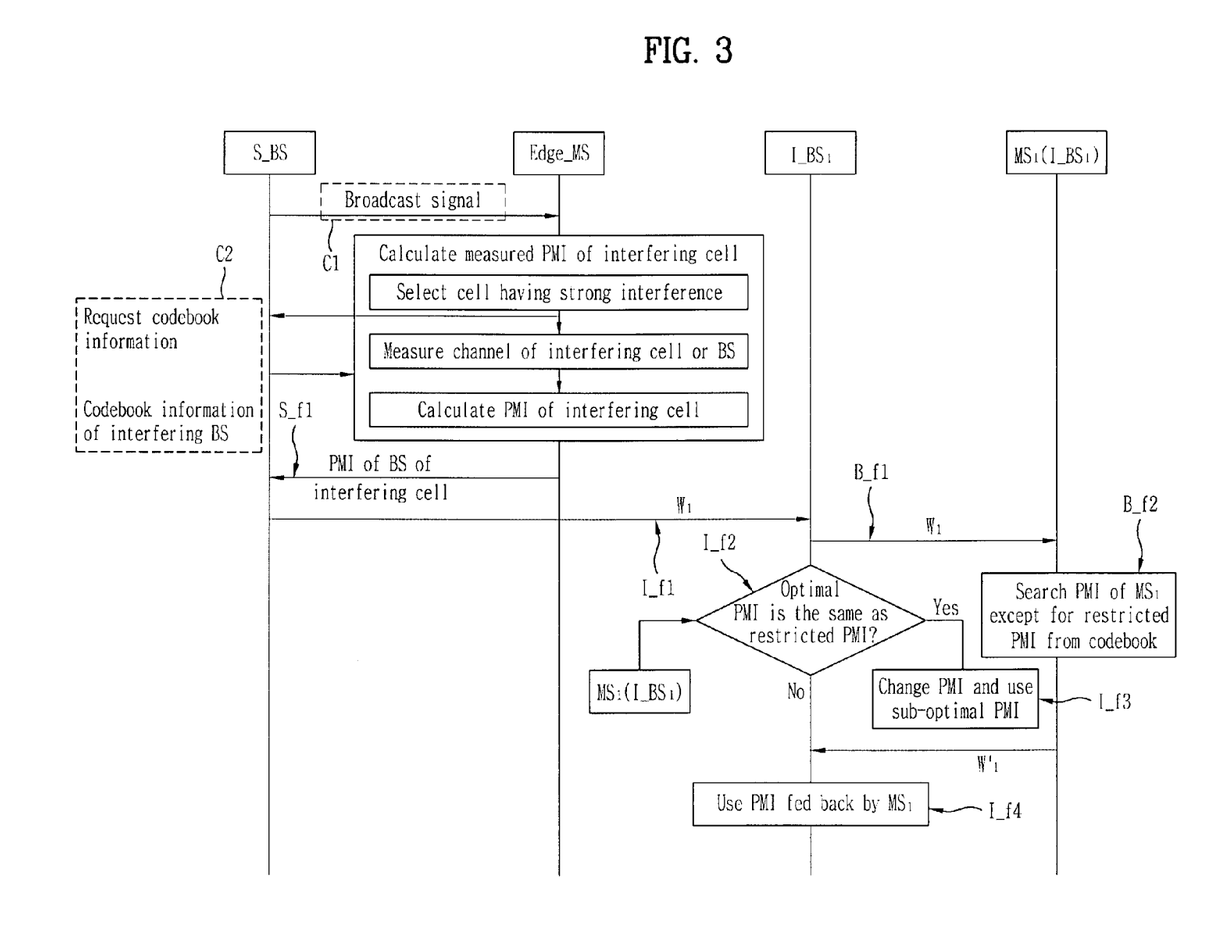
FIGS. 3 and 4 are views illustrating configurations for restricting a codebook vector used in each cell using a plurality of codebooks.
Figure 4:
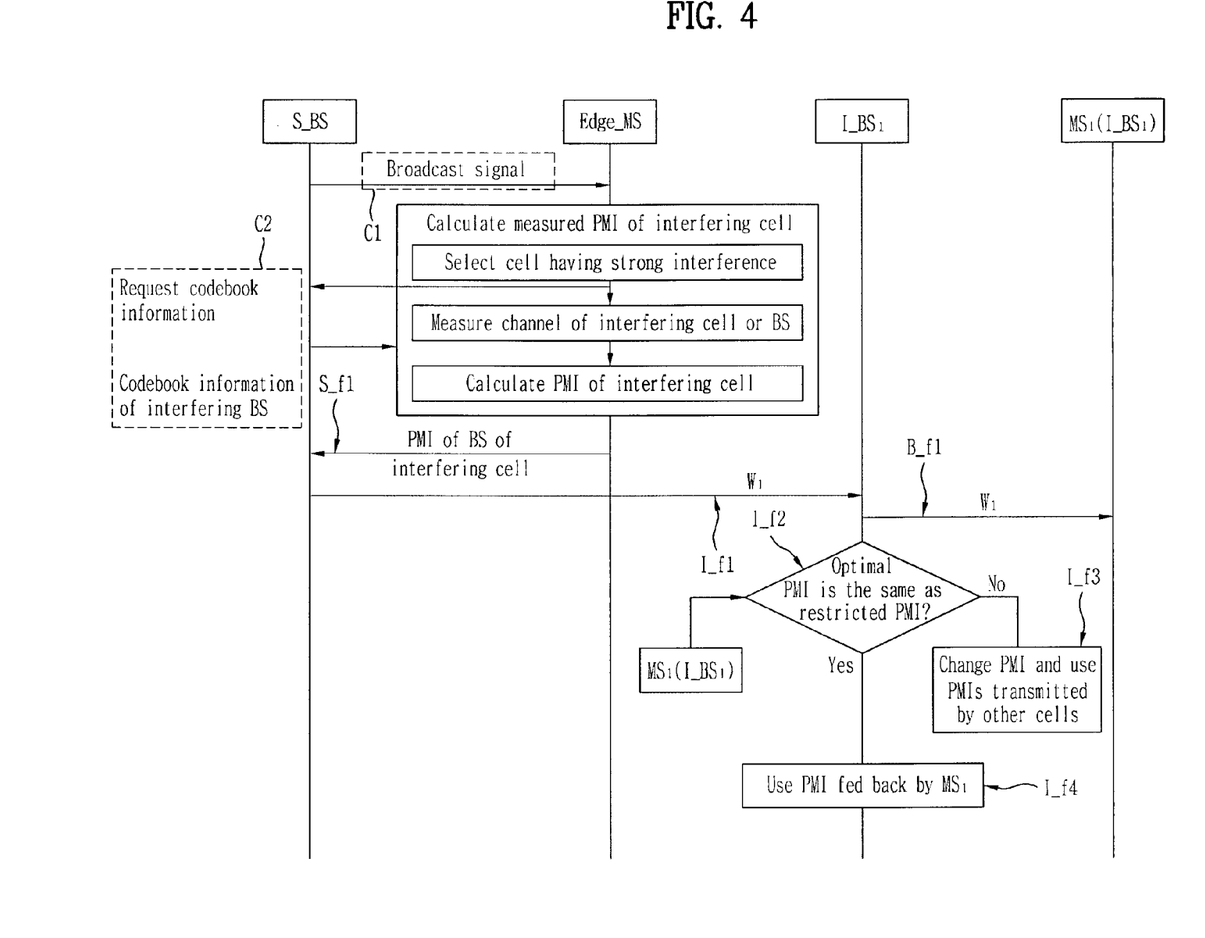

FIGS. 3 and 4 are views illustrating configurations for restricting a codebook vector used in each cell using a plurality of codebooks.

In a closed-loop MIMO system using a plurality of codebooks, an edge MS of a cell is subject to interference by an influence caused by a codebook vector used by a neighboring cell for an MS within the neighboring cell. To restrict the use of a codebook vector in an interfering cell in order to reduce an influence of inter-cell interference, information about a codebook of an interfering cell and information about a restricted PMI or a requested PMI is necessary.

As illustrated in FIG. 3, codebook information of an interfering cell is transmitted by a BS to an MS using a downlink signal (e.g., a broadcast signal) (step C1) or is transmitted to the MS at the request of the MS (step C2).

Although not shown in FIG. 3, the MS may directly estimate codebook information of the interfering cell using a signal received from the interfering cell. To restrict the use of a codebook vector of the interfering cell, an edge MS determines one or more interfering cells creating strong interference using signals received from neighboring cells, thereby estimating channel information of the interfering cells.

The edge MS can estimate a codebook vector (a restricted PMI) generating the strongest interference with respect thereto, using an estimated interfering channel and codebook vector information of each cell received from a BS or using the estimated interfering channel and codebook vector information estimated directly by an MS.

The restricted PMI information of each interfering cell, measured by the MS, is transmitted to a serving BS of a cell to which the MS belongs or to an interfering BS of an interfering cell. For example, a PMI of a BS of the interfering cell may be transmitted to the serving BS of the cell to which an MS belongs (step S_f1). The serving BS may transmit a codebook vector (e.g., $w_1$) to the BS of the interfering cell (step I_f1).

If a PMI fed back by an MS located in a central area of the interfering cell is the same as a restricted PMI, the BS of the interfering cell may restrict the use of the feedback PMI using restricted PMI information received by an edge MS. In this case, two methods may be used.

In the first method, an MS $MS_1(I\_BS_1)$ within the interfering cell measures an optimal PMI and transmits the measured optimal PMI to a BS $I\_BS_1$ of the interfering cell (step I_f1). The BS $I\_BS_1$ of the interfering cell compares the optimal PMI with a restricted PMI transmitted by another cell (step I_f2). If the optimal PMI is the same as the restricted PMI, the BS causes the MS $MS_1(I\_BS_1)$ of the interfering cell to use a sub-optimal PMI (step I_f3). Conversely, if the optimal PMI is different from the restricted PMI, the BS causes the MS $MS_1(I\_BS_1)$ of the interfering cell to use the optimal PMI (step I_f4).

As another method, the BS $I\_BS_1$ of the interfering cell transmits the restricted PMI to the MS $MS_1(I\_BS_1)$ of the interfering cell (step B_f1). The MS $MS_1(I\_BS_1)$ of the interfering cell searches an optimal PMI except for the restricted PMI from a codebook (step B_f2) and transmits the searched PMI to the BS $I\_BS_1$ of the interfering cell. The interfering cell causes the MS $MS_1(I\_BS_1)$ thereof to use the optimal PMI except for the restricted PMI (step I_f4).

Meanwhile, a codebook vector having the least effect on an edge MS may be measured and this codebook vector may be requested to be used within the interfering cell. This embodiment is illustrated in FIG. 4.

Referring to FIG. 4, an edge MS may measure a codebook vector (a requested PMI) generating the least interference with respect thereto, using an estimated interfering channel and codebook vector information of each cell received from a BS or using the estimated interfering channel and codebook vector information estimated directly by an MS.

The requested PMI information of an interfering cell, measured by the MS, is transmitted to a serving BS of a cell to which the MS belongs or to an interfering BS of the interfering cell. For example, a PMI of the interfering cell may be transmitted to the serving BS of the cell to which the MS belongs (step S_f1). The serving BS may transmit a codebook vector (e.g., $w_1$) to a BS of the interfering cell (step I_f1).

The BS of the interfering cell uses the requested PMI received from the edge MS of a neighboring cell. If a PMI fed back by a specific MS located in a central area of the interfering cell is different from the requested PMI, the specific MS and/or a BS within the interfering cell may use the requested PMI with priority. In this case, two methods may be used.

First, a specific MS $MS_1(I\_BS_1)$ within the interfering cell measures an optimal PMI and transmits the measured optimal PMI to a BS $I\_BS_1$ of the interfering cell (step I_f1). The BS $I\_BS_1$ of the interfering cell compares the optimal PMI with a requested PMI transmitted by another cell (step I_f2). If the optimal PMI is the same as the requested PMI, the BS causes the MS $MS_1(I\_BS_1)$ of the interfering cell to use the optimal PMI, that is, the requested PMI (step I_f4). Conversely, if the optimal PMI is different from the requested PMI, the BS causes the MS $MS_1(I\_BS_1)$ of the interfering cell to use the requested or feedback optimal PMI (step I_f3).

In this case, a restricted PMI as well as the requested PMI may be transmitted by the edge MS of a neighboring cell. Then the following process may be carried out. If the feedback optimal PMI measured by the MS $MS_1(I\_BS_1)$ is the same as the requested PMI, the optimal PMI is used. If the feedback optimal PMI is different from the requested PMI but is the same as the restricted PMI, an optimal PMI of a codebook except for the restricted PMI may be used or the requested PMI may be used. If the feedback optimal PMI is different from the requested PMI and the restricted PMI, the optimal PMI or requested PMI may be used.

As another method, the BS $I\_BS_1$ of the interfering cell transmits the requested PMI to the MS $MS_1(I\_BS_1)$ of the interfering cell (step B_f1) so as to perform a process of determining a feedback PMI. If the optimal PMI measured by the MS $MS_1(I\_BS_1)$ is the same as the requested PMI, the optimal PMI may be fed back. If the optimal PMI is different from the requested PMI, the requested PMI or the optimal PMI may be fed back. In this case, a restricted PMI as well as the requested PMI may be transmitted by the BS $I\_BS_1$ of the interfering cell. Then the following process may be carried out. If the optimal PMI measured by the MS $MS_1(I\_BS_1)$ is the same as the requested PMI, the optimal PMI may be fed back. If the measured optimal PMI is different from the requested PMI but is the same as the restricted PMI, an optimal PMI of a codebook except for the restricted PMI may be fed back or the requested PMI may be fed back. If the measured optimal PMI is different from the requested PMI and the restricted PMI, the optimal PMI or requested PMI may be fed back.

In the above-described embodiments, an edge MS of a serving cell may measure one or more PMIs of one interfering cell and transmit the measured PMIs to a serving cell and/or an interfering cell. In this case, a CQI, a carrier to interference-plus-noise ratio (CINR), an SINR, an interference level, an interference vector, or an interference power may be transmitted together with the PMIs.

Multiple MSs may feed back restricted PMIs or requested PMIs to one interfering cell. When multiple feedback restricted PMIs and/or requested PMIs are present, application of all the PMIs may not be desirable. Accordingly, the interfering cell may determine an order for an interference degree of the respective restricted PMIs and/or requested PMIs, using a CQI, a CINR, an SINR, an interference level, an interference vector, or an interference power which may be fed back together with the restricted PMIs and/or requested PMIs and may select a restricted PMI and/or requested PMI which are to be applied to the interfering cell. Then conflict between the restricted PMIs of the MSs can be solved.

As another embodiment of the present invention, if a codebook of each cell is statically used, PMI and codebook information for restricting the use of a codebook vector in an interfering cell may be transmitted to an upper layer, thereby utilizing the PMI and the codebook information for a long time period. Therefore, overhead can be reduced. Moreover, since additional complicated operations for removing inter-cell interference are not necessary, complexity is low.

The embodiments described above are provided by combining components and features of the present invention in specific forms. The components or features of the present invention can be considered optional if not explicitly stated otherwise. The components or features may be implemented without being combined with other components or features. The embodiments of the present invention may also be provided by combining some of the components and/or features. The order of operations in the embodiments of the present invention may be changed. Some components or features of one embodiment may be included in another embodiment or may be replaced with corresponding components or features of another embodiment. It is apparent that the present invention may be embodied by a combination of claims which do not have an explicit cited relation in the appended claims or may include new claims by amendment after application.

The embodiments of the present invention have been described focusing on the data communication relationship between a base station and a mobile station. Here, the base station refers to a terminal node of a network communicating directly with the mobile station. In some cases, a specific operation described as being performed by the base station may be performed by an upper node of the base station. Namely, it is apparent that the base station or any other network nodes may perform various operations for communication with the mobile station in a network comprised of a plurality of network nodes including base stations. The term 'base station' may be replaced with the term 'fixed station', 'Node B', 'eNode B' (eNB), 'access point', etc. The term 'mobile station' may be replaced with the term 'user equipment' (UE), 'mobile subscriber station' (MSS), etc.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be implemented in the form of modules, procedures, functions, etc. which perform the above-described functions or operations. Software code may be stored in a memory unit so as to be driven by a processor. The memory unit is located at the interior or exterior of the processor and may transmit data to and receive data from the processor via various known means.

INDUSTRIAL APPLICABILITY

The present invention provides a high-quality service to an edge MS when MSs in an edge of a cell using closed-loop MIMO are subject to interference from neighboring cells in a multi-cell environment, thereby reducing an effect of inter-cell interference.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for avoiding inter-cell interference in a closed-loop multiple-input multiple-output (MIMO) system using a plurality of codebooks, the method being performed by a serving cell and comprising:
    receiving, from a mobile station (MS), a request for information about one or more codebooks used in one or more neighboring cells generating interference with respect to the MS;
    transmitting, to the MS, the information about the one or more codebooks used in the one or more neighboring cells among the plurality of codebooks;
    receiving, from the MS, a restricted precoding matrix index (PMI) indicating a restricted precoding matrix to be not used in the one or more neighboring cells; and
    transmitting, to the one or more neighboring cells, the restricted PMI,
    wherein the restricted PMI is determined among the one or more codebooks.

2. The method of claim 1, wherein:
    the information is transmitted by using one or more of: a broadcast channel, a multicast channel, and a unicast channel, and the one or more neighboring cells are all cells adjacent to a serving cell to which the mobile station belongs.

3. The method of claim 1, wherein the information about the one or more codebooks includes information indicating that each of the one or more codebooks is for a single user or for multiple users.

4. A method for avoiding inter-cell interference in a closed-loop multiple-input multiple-output (MIMO) system using a plurality of codebooks, the method being performed by a mobile station (MS) and comprising:
   transmitting, to a serving cell, a request for information about one or more codebooks used in one or more neighboring cells which generate interference with respect to the MS;
   receiving, from the serving cell, the information about the one or more codebooks used in the one or more neighboring cells among the plurality of codebooks;
   measuring channel status and interference of the one or more neighboring cells;
   calculating a restricted precoding matrix index (PMI) indicating a restricted precoding matrix to be not used in the one or more neighboring cells; and
   transmitting, to the serving cell, the restricted PMI,
   wherein the restricted PMI is determined among the one or more codebooks.

5. The method of claim 4, wherein the information is transmitted by using a handover message.

6. The method of claim 4, wherein:
   the information is transmitted by using one or more of a broadcast channel, a multicast channel, and a unicast channel, and
   the one or more neighboring cells are all cells adjacent to a serving cell to which the mobile station belongs.

7. The method of claim 4, wherein the information about the one or more codebooks includes information indicating that each of the one or more codebooks is for a single user or for multiple users.

* * * * *